Nov. 8, 1932.  J. F. MURRAY  1,887,244
CONDUIT FORMING APPARATUS AND PROCESS
Filed Aug. 17, 1928
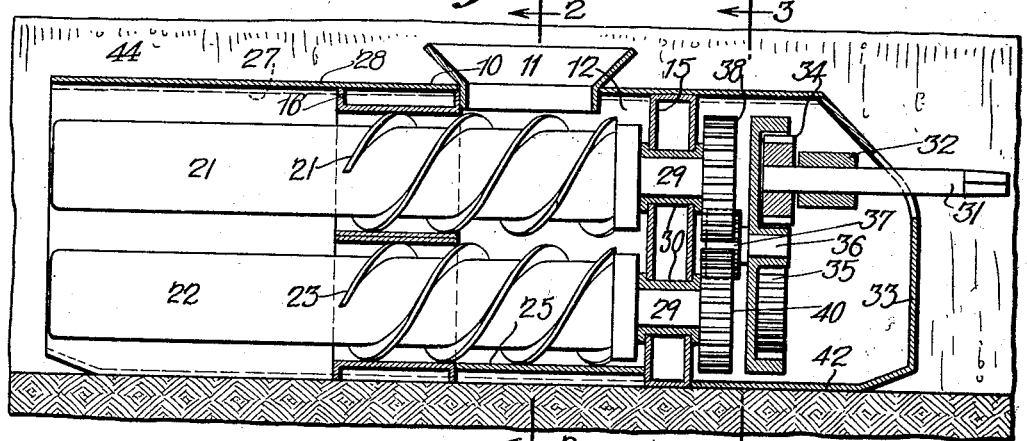
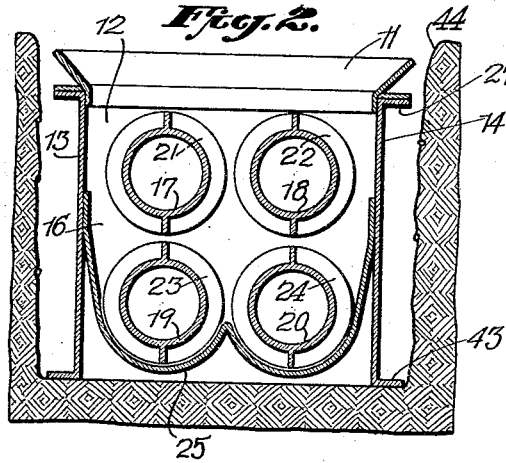
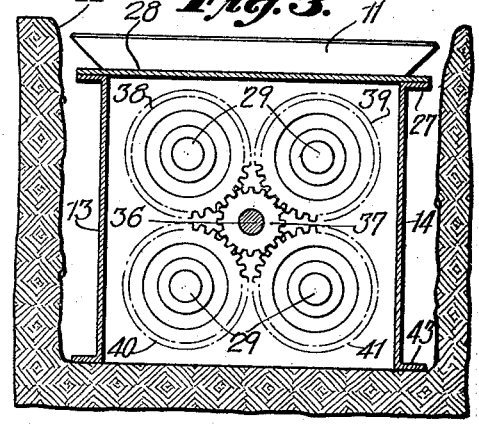
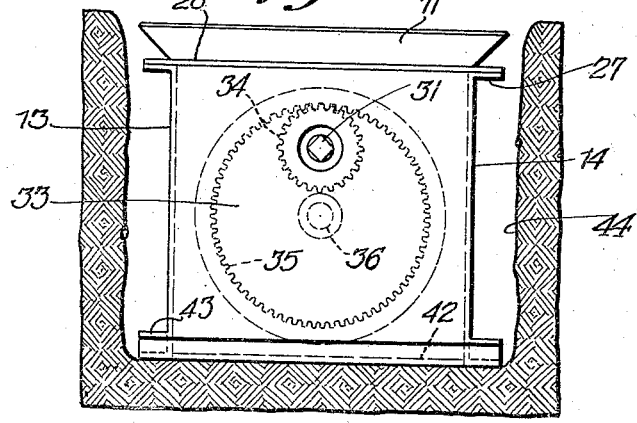
Inventor
JOHN F. MURRAY.
By His Attorney
D. Anthony Usina Patented Nov. 8, 1932

1,887,244

UNITED STATES PATENT OFFICE

JOHN F. MURRAY, OF BROOKLYN, NEW YORK, ASSIGNOR TO METROPOLITAN DEVICE CORPORATION, A CORPORATION OF NEW YORK

CONDUIT FORMING APPARATUS AND PROCESS

Application filed August 17, 1928. Serial No. 300,257.

My present invention relates to a method and apparatus for forming conduits, particularly underground conduits having a plurality of ducts for carrying electric cables.

An object of the invention is to provide a method and apparatus for forming continuous conduits in which cement or other plastic material is forced into position uniformly and with a continuous, uniform pressure, thereby ensuring a uniformly dense and impervious conduit wall.

Other objects of the invention are; to provide a method and apparatus for forming continuous conduits in which plastic material is forced into a progressively movable mold by a pressure which re-acts to create a direct thrust in the direction of movement of the mold and to advance the latter proportionately as the conduit construction advances; to provide a molding means that ensures a smooth, unbroken interior for the conduit; to provide an apparatus in which a plurality of conduits may be simultaneously formed; and to provide a simple, direct acting mechanism in which the forcing of the plastic material and advancement of the mold may be accomplished with a minimum expenditure of power.

With these and other objects in view, which will appear more in detail from the following description, the invention comprises the method and apparatus described and set forth in the following specification and claims.

The various features of the invention are illustrated in the accompanying drawing, in which:

Fig. 1 is a longitudinal sectional view of a conduit forming machine embodying the preferred form of the invention.

Fig. 2 is a vertical section taken on line 2—2 of Fig. 1.

Fig. 3 is a vertical section taken on the line 3—3 of Fig. 1.

Fig. 4 is an end view of the apparatus taken from the advancing or driving end, a portion of the end wall being broken away to more clearly show the interior construction.

In my invention, the concrete or other plastic material to be formed into a conduit is placed in a feeding compartment in which are positioned one or more duct forming cores or mandrels which extend from the front wall of the compartment rearwardly through a cylindrical feed opening into an open ended, rearwardly disposed molding compartment. Each core is provided with helical vanes extending through the feed opening and is rotated to force the plastic material from the feed chamber through the feed opening into the molding compartment. When the molding compartment is filled with plastic material, the further rotation of the mandrel or core imposes a pressure on the plastic material therein, which re-acts in a direct, forward thrust on the core and its supporting apparatus and thereby, upon the attainment of sufficient pressure, forces the entire molding apparatus forwardly. One or more cores or mandrels may be used to form a corresponding number of ducts, four of such cores being shown, by way of example, in the accompanying drawing.

Referring more particularly to the accompanying drawing, the cement or concrete is supplied to a molding apparatus 10 through a hopper 11, and is received in a feeding compartment 12. The compartment 12 is formed between side walls 13 and 14 of the molding apparatus, a front wall 15 and a rear wall 16. The concrete material fills the compartment 12 around four parallel, spaced cores 17, 18, 19 and 20, which extend horizontally from the front wall 15 of the compartment 12 through suitably positioned cylindrical feed passages 21, 22, 23 and 24, respectively, extending rearwardly from the rear wall 16 of the compartment. The material is supported in the compartment 12 by a trough 25 which forms the bottom of the compartment 12, and is suitably curved to conform to, and be slightly spaced from, the lowermost cores 19 and 20.

Each of the cores 17–20 is encircled with a pair of continuous, helical vanes 26 rigidly secured to, and extending from, the front ends of the cores into the cylindrical passageways 21–24. Upon the rotation of the cores 17–20 in a suitable direction, the plastic material is worked uniformly about the cores within the chamber 12 and is forced by the helical vanes 26 rearwardly through the passageways 21–24 into a molding compartment 27 at the rear of the feeding compartment 12. The molding compartment 27 is closed at its sides by the side walls 13 and 14, and at its top by a cover plate 28, the rear of the compartment being closed only by plastic material already formed and set in position, and the bottom being closed by the surface on which the conduit is to be laid.

As the plastic material is forced by the rotating helical vanes 26 into the compartment 27, it completely fills the compartment. The further rotation of the vanes serves to pack the material under pressure. This pressure re-acts against the vanes 26, causing a forward thrust on the cores 17–20, which is received by the front plate 15. When this thrust becomes sufficient to overcome the weight and resistance to movement of the molding apparatus, it causes the latter to move forwardly, thus permitting an additional quantity of plastic material to be forced into the compartment 27. As the vanes 26 are continuously rotated, the apparatus moves gradually and continuously forward under the re-action to continuous, uniform pressure on the plastic material.

The diameter of the cylindrical passageways 17–20 is equal to the diameter of the outer edge of the vanes 26, so that the vanes and cores are journalled and supported in the cylindrical passageways. The cores are supported at their front ends by means of journals 29 of reduced diameter, which extend through bearings or bushings 30 in the front wall 15.

The cores 17–20 may be rotated by any suitable means that will ensure a uniform, simultaneous movement of all of the cores. In the embodiment shown in the accompanying drawing, the motive power is supplied to a shaft 31, which is journalled in a bearing 32 in a compartment 33 at the front end of the apparatus and is provided with a gear wheel 34 which meshes with an internal gear 35 immediately back of the end of the shaft 31. The gear 35 is centered and supported by a rearwardly extending shaft 36, having a gear 37 which is positioned centrally of, and meshes with, each of four gears 38, 39, 40 and 41 secured on the forwardly projecting ends of the journals 29 of the cores 17–20, respectively.

It will be apparent that, upon the rotation of the shaft 31, each of the gears 38–41 is simultaneously and uniformly rotated in the same direction.

Through the above invention the plastic material is forced into position in a forwardly movable molding compartment under a uniform and continuously acting pressure and the reaction from this pressure serves directly to advance the molding apparatus. The rotation of the cores 17–20 has an additional advantage of forming a very smooth interior surface for the ducts and, as the principal movement is circular, the tendency for any portion of the material to fall or be dragged inwardly is thereby greatly reduced. To still further avoid any disturbance of the surface of the ducts by the rear edges of the cores, the ends of the cores are slightly rounded. But the uniform diameter of cores is maintained practically to the end. Experience has shown that the pressure of the cores on the concrete should be maintained practically uniform throughout the length of the core to prevent particles of concrete from being loosened from the face of the duct and falling into the latter, from which it must be cleaned out afterwards.

The compartment is closed by the double wall 15 against entry of concrete and by the top and sides and the bottom 42 against entry of earth. This bottom, and the flanges 43, form a sort of skid support of the apparatus directly on the earth bottom of the trench 44, which offers a frictional resistance proportional to the constant weight of the apparatus and tends to secure uniformity of movement.

As changes of construction could be made within the scope of my invention, it is intended that all matter contained in the above description or shown in the accompanying drawing shall be interpreted as illustrative and not in a limiting sense.

Having now described my invention, what I claim as new and desire to secure by Letters Patent is:

1. Apparatus of the type described which comprises an open ended bottomless mold, a feed chamber for plastic material, a plurality of feed openings from said feed chamber to said open ended mold, a plurality of cylindrical cores, one for each of said feed openings, extending from said feed chamber through said feed openings into said open ended mold, and a helical feed vane on each of said cores.

2. Apparatus of the type described which comprises an open ended mold, a feed chamber for plastic material, a plurality of tubular feed passages from said feed chamber to said open ended mold, a plurality of cylindrical cores, one for each of said feed passages extending from said feed chamber through said feed passages into said open ended mold, a helical feed vane on each of said cores, a driving gear on each of said cores, and a common driving means engaging each of said gears.

3. Apparatus of the type described which comprises a longitudinally movable mold having a feed chamber for plastic material in advance of said mold, a plurality of cylindrical passageways from said feed chamber to said mold, cores centered one in each of said passageways, means for continuously rotating said cores, and means reacting against said core for continuously feeding plastic material into said mold upon the rotation of said core, said apparatus having supporting skids which offer a substantially constant frictional resistance to its longitudinal movement.

4. Apparatus of the type described which comprises a pair of side walls and a cover plate forming an open ended open bottom mold chamber, a feed chamber in advance of said mold chamber, a plurality of cylindrical passages from said feed chamber to said mold chamber, a plurality of cores, one for each of said cylindrical passages, extending through said feed chamber, said cylindrical passages and into said mold chamber, a pair of continuous helical vanes on each of said cores, the outer edges of said vanes contacting with said cylindrical feed passages to support said cores, a trough in the lower part of said feed chamber forming and contacting with the edges of the lowermost of said helical vanes, and means in said feed chamber for simultaneously and uniformly rotating said cores.

5. Apparatus for forming continuous conduits which comprises a feed compartment for plastic material, feed passages from said compartment, rotating cores projecting from said compartment through said feed passages, means for continuously feeding plastic material from said compartment through said passages about said cores, and open ended means for confining said plastic material on the ground immediately at the outlet of said feed passages.

6. Apparatus of the type described which comprises a longitudinally movable bottomless mould having a feed chamber for plastic material, a horizontal cylindrical core extending from said feed chamber into said mould and means for forcing plastic material from said feed chamber longitudinally about said core into said mould.

7. Apparatus of the type described which comprises a longitudinally movable bottomless mould having an open end, a feed chamber for plastic material, a horizontal cylindrical core extending from said feed chamber into said mould and means for continuously forcing plastic material from said feed chamber longitudinally about said core into said mould.

8. Apparatus of the type described which comprises a longitudinally movable bottomless mould having an open end, a feed chamber for plastic material, a cylindrical rotatable horizontal core extending from said feed chamber into said mould and toward its open end, means for rotating said core and means for forcing plastic material longitudinally about said core from said feed chamber into said mould.

9. Apparatus of the type described which comprises a longitudinally movable mold, an open ended feed chamber for plastic material in advance of said mold, a cylindrical passageway of smaller cross sectional area than that of said mold connecting said feed chamber and said mold, a rotatable cylindrical core extending from said feed chamber through said cylindrical passageway into said mold and having a helical vane fixed thereto within said cylindrical passageway.

10. A method of forming conduits in a mass of plastic material, which comprises forcing said plastic material from a supply mass thereof through separate cylindrical passageways, one for each conduit, and uniting and confining the material thus forced through said separate passageways in a common mass, holding stationary at least part of its surface, and against which said material forced through said passageways reacts.

In witness whereof, I have hereunto signed my name.

JOHN F. MURRAY.